US012805434B2

(12) United States Patent
Ampler

(10) Patent No.: US 12,805,434 B2
(45) Date of Patent: Nov. 24, 2026

(54) ROTATABLE PART OF A TRIMMING APPARATUS AND A TRIMMING APPARATUS FOR CUTTING AND REMOVING OF GRASS AND OTHER VEGETATION ADJACENT A SPRINKLER HEAD OF A WATERING SYSTEM

(71) Applicant: KSAB Golf Equipment Aktiebolag, Västerås (SE)

(72) Inventor: Leif Ampler, Hovås (SE)

(73) Assignee: KSAB Golf Equipment Aktiebolag, Västerås (SE)

( * ) Notice: Subject to any disclaimer, the term of this patent is extended or adjusted under 35 U.S.C. 154(b) by 309 days.

(21) Appl. No.: 18/588,151

(22) Filed: Feb. 27, 2024

(65) Prior Publication Data

US 2024/0284825 A1 Aug. 29, 2024

(30) Foreign Application Priority Data

Feb. 28, 2023 (EP) .................................... 23159165

(51) Int. Cl.
*A01D 34/84* (2006.01)
*A01G 3/06* (2006.01)

(52) U.S. Cl.
CPC ............. *A01D 34/84* (2013.01); *A01G 3/062* (2013.01)

(58) Field of Classification Search
CPC ........ A01D 34/84; A01G 3/062; A01G 3/088; A01B 1/246; A01B 1/165
See application file for complete search history.

(56) References Cited

U.S. PATENT DOCUMENTS 2,718,838 A * 9/1955 Schumacher .......... A01G 3/062 172/66
2,745,331 A * 5/1956 Lancour ................. A01G 3/062 172/15
2,913,058 A * 11/1959 Smith .................... A01G 3/062 172/14

(Continued)

OTHER PUBLICATIONS

Extended European Search Report issued for priority European Application No. 23159165.2, issued on Aug. 1, 2023.

*Primary Examiner* — Christopher J Sebesta
*Assistant Examiner* — Julia C Tran
(74) *Attorney, Agent, or Firm* — Paul R. Steffes

(57) ABSTRACT

A rotatable part (1) of a trimming apparatus (3) is arranged for cutting and removing of grass and other vegetation adjacent a sprinkler head of a watering system. The rotatable part (1) comprises an elongated shaft (5) and a cutting head (11) connected to the elongated shaft (5). The cutting head (11) comprises at least one arm (15), preferably three arms (15). The at least one arm (15) comprises a cutting element (17) connected to a distal end (19) of the at least one arm (15). The cutting element (17) comprises a central part (21) connected tangentially to an outermost edge (23) of the distal end (19) of the at least one arm (15) radially in relation to the connection central portion (13), and a rear part (25) arranged at an angle (α) in relation to the central part (21) and arranged at a rear edge (27) of the central part (21) in relation to a rotational direction (rd) of the cutting head (11) during rotation of the cutting head (11). A trimming apparatus (3) comprises a rotatable part (1).

14 Claims, 3 Drawing Sheets

(56) References Cited

U.S. PATENT DOCUMENTS

| | | | | | |
|---|---|---|---|---|---|
| 3,174,224 | A * | 3/1965 | Rousselet | A01G 3/062 172/15 |
| 3,554,293 | A * | 1/1971 | Aman | A01G 20/30 172/13 |
| 3,747,214 | A * | 7/1973 | Bohlman | A01G 3/06 30/287 |
| 3,814,189 | A | 6/1974 | Thompson | |
| 3,905,103 | A | 9/1975 | Ford | |
| 3,923,102 | A * | 12/1975 | Morris | A01D 34/84 30/DIG. 7 |
| 4,862,682 | A * | 9/1989 | Wait | A01D 34/84 56/255 |
| 5,493,783 | A * | 2/1996 | Oostendorp | A01D 34/84 30/287 |
| 6,134,789 | A | 10/2000 | Strickland | |
| 6,412,568 | B1 * | 7/2002 | Thede | A01G 3/06 172/13 |
| 6,857,480 | B2 * | 2/2005 | Thompson, Sr. | A01B 1/24 172/13 |
| 8,201,639 | B2 * | 6/2012 | Szurpicki | A01B 1/00 172/380 |
| 2008/0135267 | A1 * | 6/2008 | Karczewski | A01B 1/14 172/378 |
| 2021/0153430 | A1 * | 5/2021 | Dimitracopoulos | A01D 34/73 |
| 2024/0122102 | A1 * | 4/2024 | Tybuszynski | A01D 34/68 |

* cited by examiner

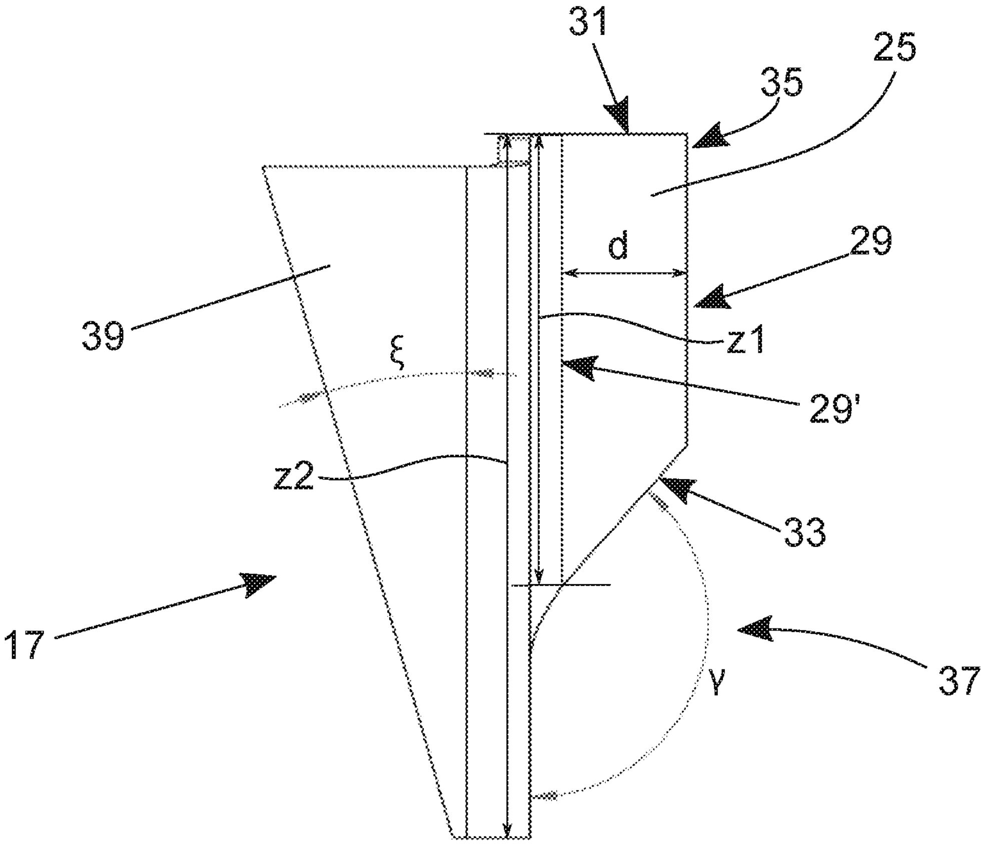
Fig. 2.1
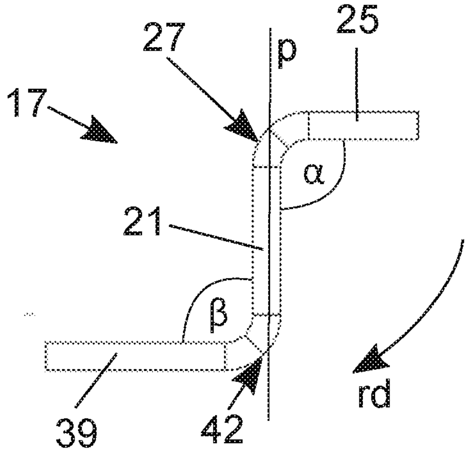
Fig. 2.2
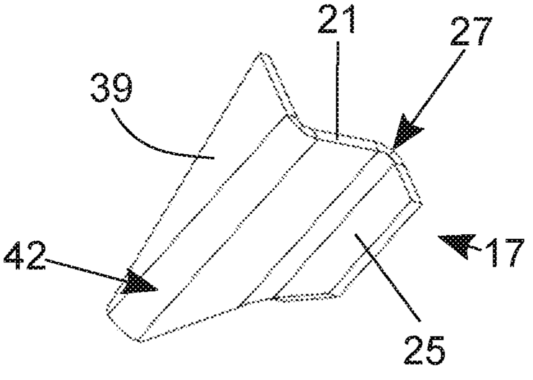
Fig. 2.3

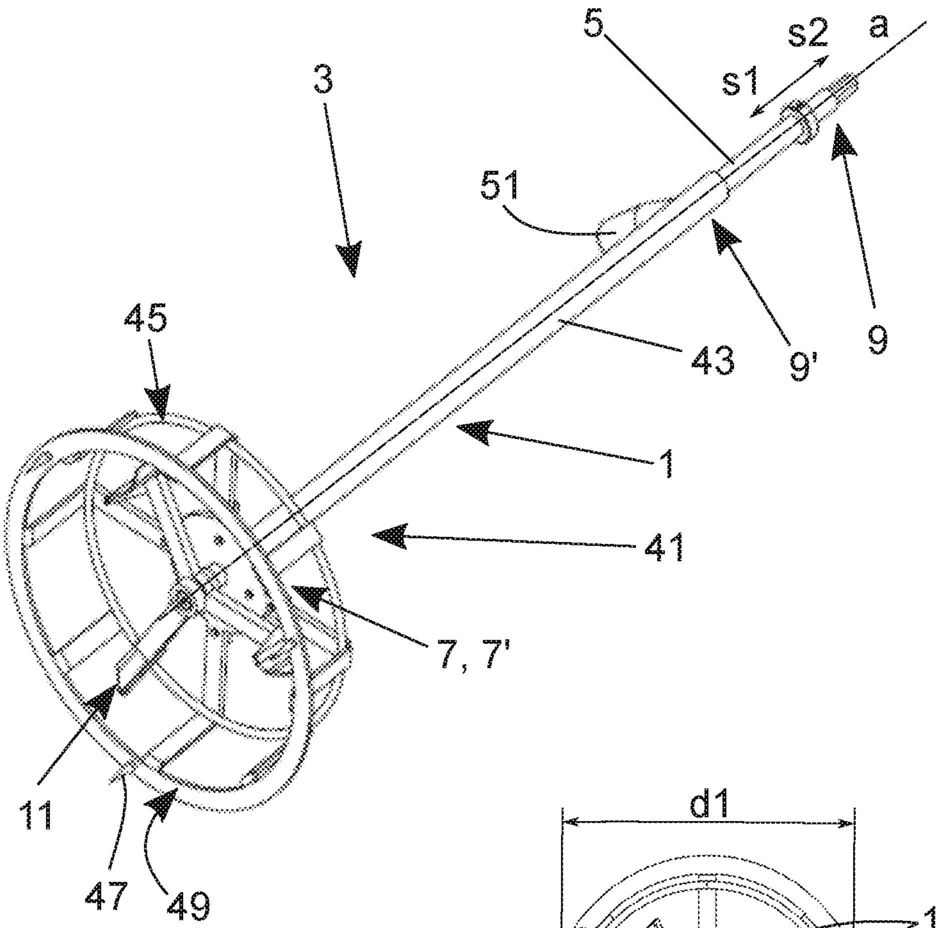
Fig. 3.1
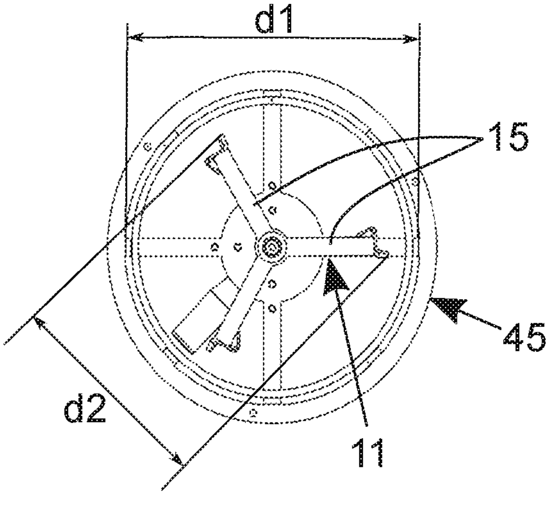
Fig. 3.2

ROTATABLE PART OF A TRIMMING APPARATUS AND A TRIMMING APPARATUS FOR CUTTING AND REMOVING OF GRASS AND OTHER VEGETATION ADJACENT A SPRINKLER HEAD OF A WATERING SYSTEM

This application claims priority to European Patent Application No. 23159165.2, filed Feb. 28, 2023, which is hereby incorporated herein by reference in its entirety.

TECHNICAL FIELD

The present invention relates to trimming apparatus for cutting and removing of grass and other vegetation adjacent a sprinkler head of a watering system, preferably on a golf course.

BACKGROUND

In recent years, playing golf has become a common way of spending time for training and for relaxing. A golf course need to be watered and a sprinkler systems is a usual way for watering. The sprinkler systems include a plurality of sprinkler heads placed in the ground. A golf course comprises a large number of sprinkle heads. The sprinkler heads usually spray water in all directions. Usually the sprinkler heads have a pop-up function for a central part that can move upwards for spraying water. The vertical position of non-removable sprinkler heads is low enough not to impede the normal use of the lawn and are generally low enough not to be readily visible. Each of the sprinkler heads must be sufficiently high above the ground so that the adjacent soil and vegetation does not impede the water spray. However, as the vegetation grows, it will, in due time, impede the water spray of any types of sprinkler heads and must be cut. Also dirt and soil can prevent the proper function of the sprinkler head and must therefore be removed.

Efforts have been made to develop trimming apparatus for cutting grass adjacent sprinkler heads of a watering systems. U.S. Pat. Nos. 3,905,103 and 3,814,189 each describes a tool comprising a generally tubular or cylindrical part and cutting blades arranged to rotate within the tubular or cylindrical part to cut grass adjacent a sprinkler head of a watering system.

One disadvantage with the known tools is that the cut grass or vegetation need to be removed by hand from the area adjacent the sprinkler head, which is time consuming and demanding for an user.

SUMMARY

It is an object of the present invention to overcome, or at least alleviate, at least some of the above-mentioned problems and drawbacks.

The above-mentioned object is achieved by the present invention according to the independent claims.

Preferred embodiments are set forth in the dependent claims.

According to a first aspect of the invention, the object is achieved by a rotatable part of a trimming apparatus arranged for cutting and removing of grass and other vegetation adjacent a sprinkler head of a watering system according to claim 1.

Thus, the object is achieved by a rotatable part of a trimming apparatus arranged for cutting and removing of grass and other vegetation adjacent a sprinkler head of a watering system. The rotatable part comprises:

- an elongated shaft having a lower end and an upper end in an intended position for use of the rotatable part, wherein the elongated shaft is configured for rotation about a center longitudinal axis extending through the elongated shaft, wherein the upper end is arranged for connection to a driving device to achieve the rotation of the elongated shaft, and
- a cutting head comprising a connection central portion arranged for connection of the cutting head to the lower end of the elongated shaft and arranged for transfer of the rotation of the elongated shaft to the cutting head, wherein the cutting head comprises at least one arm, preferably three arms, extending radially from the connection central portion, wherein the at least one arm comprises a cutting element connected to a distal end of the at least one arm in relation to the attachment central portion, wherein the cutting element comprises:

- a central part connected tangentially to an outermost edge of the distal end of the at least one arm radially in relation to the connection central portion, and
- a rear part arranged at an angle in relation to the central part and arranged at a rear edge of the central part in relation to a rotational direction of the cutting head during rotation of the cutting head.

Because the rear part is arranged at the angle in relation to the central part and arranged at a rear edge of the central part in relation to a rotational direction, during rotation of the cutting head, grass and other vegetation, herein called cut materia, will be cut and pressed radially outwards from the cutting head. The rear part will initially act with pressure forces on the cut materia forcing the grass and other vegetation in the rotational direction. Further, because of the accumulation of the cut materia in front of the rear part the cut materia will be forced radially outwards from the cutting head. The cutting element performs in a similar way to a plough for plowing land during use. Further, the rear part creates centrifugal forces acting on the cut materia forcing the cut materia radially outwards from the cutting head. Thereby, the cut materia can be cut and removed from the area adjacent a sprinkler head of a watering system in an efficient way an without the need of an additional effort of a user.

Accordingly, a rotatable part is provided overcoming, or at least alleviating, at least some of the above-mentioned problems and drawbacks. As a result, the above-mentioned object is achieved.

Optionally, the angle is 90°.

Optionally, the rear part has a shape of a trapezoid with two long sides arranged parallel to each other, a third short side arranged substantially perpendicular to the long sides and a fourth short side arranged with other angles than 90° in relation to the long sides. With the shape of trapezoid the cut materia can be cut and removed from the area adjacent a sprinkler head in an efficient way by an improved effect of a plough.

Optionally, the cutting element has an upper side and a lower side in the intended position for use of the rotatable part and wherein the fourth short side is arranged at the lower side of the cutting element.

Optionally, the rear part has a first long side and a second long side of the two long sides, wherein the second long side is arranged to have contact with the central part and wherein the second long side is longer than the first long side arranged at a distance d from the central part.

Optionally, the cutting element comprises a front part arranged at a further angle in relation to the central part and arranged at a front edge of the central part in relation to the rotational direction of the cutting head during rotation of the cutting head, wherein the front part is arranged on the opposite side of a plane p through the central part in relation to the rear part. Preferably, the further angle is 90°. Because the cutting element comprises the front part a bigger area of the materia is cut comparing to a cutting element without the front part. Further, materia in the area between the cutting element a sprinkler head can be cut and removed. Thus, a yet improved cutting element is provided and thereby a yet improved rotatable part of a trimming apparatus.

Optionally, the central part of the cutting element has a shape of a further trapezoid. In a similar way to the rear part, the central part may comprise two long sides and two short sides, wherein the short side at the lower side of the cutting element is arranged at different angles than 90°. The central part and the rear part may be arranged such that there is a continuous lower side of the cutting element formed by the acute angled short sides of the central part and the rear part. Thus an improved plough/wedge like shape of the cutting element is provided which improves the cutting characteristics of the cutting element.

Optionally, the front part of the cutting element has a shape of a triangle. Preferably, the triangle is a right-angled triangle with one of the perpendicular sides connected to the central part and the other perpendicular side arranged at the top, i.e. at the upper side, of the cutting element in relation to the intended position for use. Thus, the front part is angled as a wedge pointing downwards towards the ground in the intended position for use. With the shape of a triangle of the front part cutting and premovement of the cut materia by the front part is improved. Thus, a yet improved plough/wedge like shape of the cutting element is provided which yet improves the cutting characteristics of the cutting element.

Optionally, the cutting element is made of a sheet material, preferably of a metal plate.

Optionally, the cutting element is arranged as a one-piece element, preferably made by a bending process of a prefabricated piece of a sheet material.

According to a second aspect of the invention, the object is achieved by a trimming apparatus according to the independent claim related to trimming apparatus.

Thus, the object is achieved by a trimming apparatus arranged for cutting and removing of grass and other vegetation adjacent a sprinkler head of a watering system, the trimming apparatus comprises:

- a supporting part and
- a rotatable part according to any of the embodiments described herein.

The supporting part comprises:

- a hollow elongated handle having a further lower end and a further upper end in an intended position for use of the supporting part and
- a supporting head connected to the further lower end of the hollow elongated handle, wherein the elongated shaft of the rotatable part is positioned inside the hollow elongated handle such that the elongated shaft can rotate about a center longitudinal axis a in relation to the hollow elongated handle and can move in a first and second direction along the center longitudinal axis a in relation to the hollow elongated handle, wherein the supporting head is arranged to enclose the cutting head of the rotatable part in a retracted position of the rotatable part in relation to the supporting part.

The supporting head is arranged to have dimensions such that the cutting head can be positioned within the supporting head. The cutting head can be hidden within the supporting head. Different shapes of the supporting head can be applied, such that a cross section of the supporting head can have a circular form or a square form or a hexagonal form.

Because the trimming apparatus comprises an improved rotatable part an improved trimming apparatus is provided. As a result, the above-mentioned object is achieved.

Optionally, the supporting head comprises a number of supporting elements arranged on an outer surface of the supporting head intended to face the ground during use of the trimming apparatus and arranged to be inserted into the ground. Thus, an stable supporting part is provided that may be secured in the ground for a proper positioning around the cutting head.

Optionally, the supporting part comprises a locking mechanism arranged o lock the rotatable part in relation to the supporting part. Thus, the rotatable part can be locked in relation to the supporting part, for example, in a retracted position, that may facilitate transportation of the trimming apparatus.

Optionally, the locking mechanism is arranged at the hollow elongated handle and is arranged to act with pressure forces on the elongated shaft of the rotatable part to lock the rotatable part in relation to the supporting part.

Optionally, the supporting head has a tubular framework shape with a first diameter greater than a second diameter of the cutting head.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Figure 1:
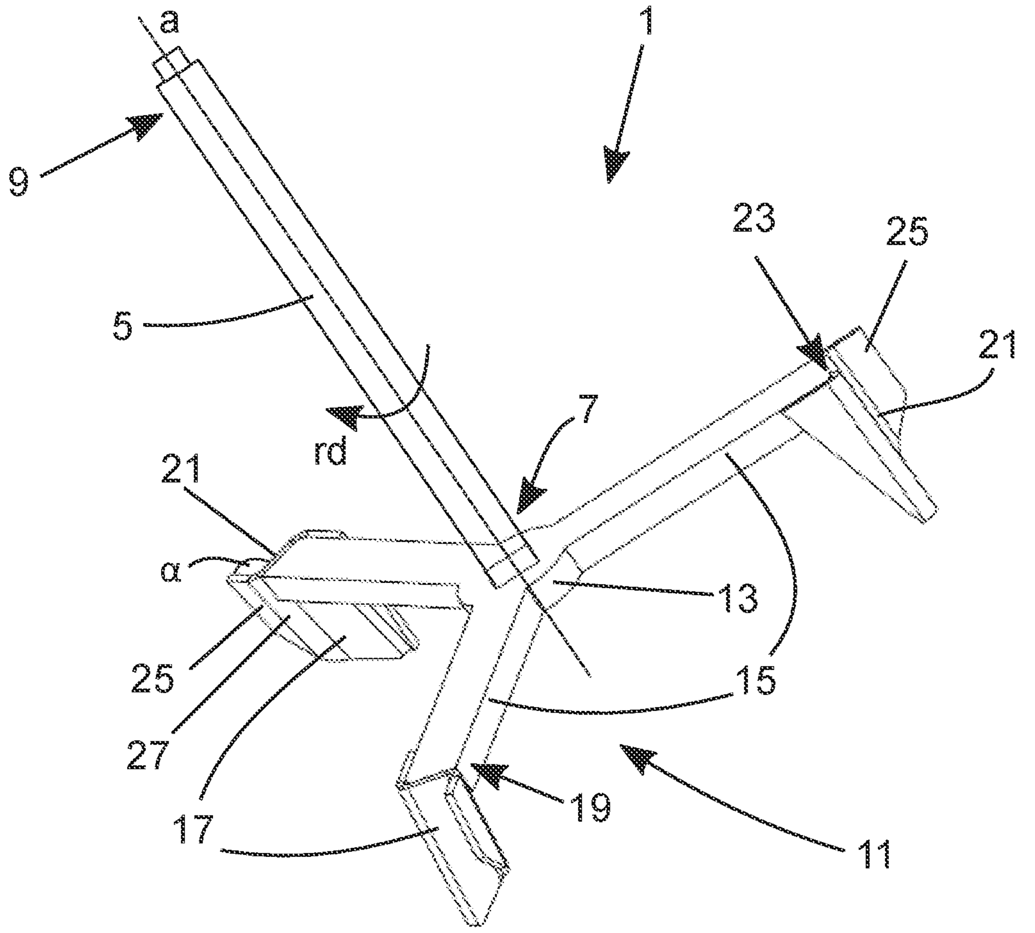
FIG. 1 is a perspective view of a rotatable part of a trimming apparatus according to an embodiment of the invention, FIG. 2.1 illustrates a perspective view of a cutting element of a cutting head of the rotatable part illustrated in FIG. 1, according to an embodiment, FIG. 2.2 illustrates another perspective view of the cutting element illustrated in FIG. 2.1, FIG. 2.3 illustrates a yet another perspective view of the cutting element illustrated in FIG. 2.1 and FIG. 2.2, FIG. 3.1 is a perspective view of trimming apparatus comprising the rotatable part illustrated in FIG. 1 according to an embodiment and FIG. 3.2 is another perspective view of the trimming apparatus illustrated in FIG. 3.1.

Aspects of the present invention will now be described more fully. Like numbers refer to like elements throughout. Well-known functions or constructions will not necessarily be described in detail for brevity and/or clarity. Throughout the figures the same, or similar, items have the same reference signs.

With reference to FIG. 1, a rotatable part 1 of a trimming apparatus 3 arranged for cutting and removing of grass and other vegetation adjacent a sprinkler head of a watering system is illustrated.

The rotatable part 1 comprises:

- an elongated shaft 5 having a lower end 7 and an upper end 9 in an intended position for use of the rotatable part 1, wherein the elongated shaft 5 is configured for rotation about a center longitudinal axis a extending through the elongated shaft 5, wherein the upper end 9 is arranged for connection to a driving device (not shown) to achieve the rotation of the elongated shaft 5, and a cutting head 11 comprising a connection central portion 13 arranged for connection of the cutting head 11 to the lower end 7 of the elongated shaft 5 and arranged for transfer of the rotation of the elongated shaft 5 to the cutting head 11.

The intended position for use of the rotatable part 1 is a substantially vertical position with lower end 7 facing the ground and the upper end 9 pointing upwards.

The driving device may for example be a drilling machine that can be connected to the upper end 9.

Further, the cutting head 11 comprises at least one arm 15, preferably three arms 15, extending radially from the connection central portion 13. Preferably, the central part 13 and the at least one arm 15 are arranged as a one-piece element. However, the at least one arm 15 can be connected to the central portion 13, for example by welding. The central portion 13 and the at least one arm 15 may be made of metal.

The at least one arm 15 comprises a cutting element 17 connected to a distal end 19 of the at least one arm 15 in relation to the attachment central portion 13. Thus, the cutting element 17 is connected to the distal end 19, wherein distal is meant outermost end radially from the central portion 13. Preferably, the cutting element 17 is connected to the arm 15 by welding.

The cutting element 17 is described in details in relation to FIG. 2.1, FIG. 2.2 and FIG. 2.3.

With reference to FIG. 2.1, FIG. 2.2 and FIG. 2.3, a cutting element 17 of a cutting head 11, of the rotatable part 1 illustrated in FIG. 1 is depicted.

The cutting element 17 comprises:

a central part 21 connected tangentially to an outermost edge 23 of the distal end 19 of the at least one arm 15 radially in relation to the connection central portion 13, and a rear part 25 arranged at an angle α in relation to the central part 21 and arranged at a rear edge 27 of the central part 21 in relation to a rotational direction rd of the cutting head 11 during rotation of the cutting head 11.

The outermost edge 23 is the edge of the at least one arm 15 arranged radially outermost from the central portion 13 of the cutting head 11.

Preferably, the angle α is 90°.

According to the embodiment illustrated in FIG. 2.1 and FIG. 2.3, the rear part 25 has a shape of a trapezoid with two long sides 29, 29' arranged parallel to each other, a third short side 31 arranged substantially perpendicular to the long sides 29, 29' and a fourth short side 33 arranged with other angles than 90° in relation to the long sides 29, 29'.

Further, the cutting element 17 has an upper side 35 and a lower side 37 in the intended position for use of the rotatable part 1 and wherein the fourth short side 33 is arranged at the lower side 37 of the cutting element 17.

The rear part 25 has a first long side 29 and a second long side 29' of the two long sides 29, 29', wherein the second long side 29' is arranged to have contact with the central part 21 and wherein the second long side 29' is longer than the first long side 29 arranged at a distance d from the central part 21.

According to the embodiments illustrated in FIG. 2.2, FIG. 2.2 and FIG. 2.3 the cutting element 17 comprises a front part 39 arranged at a further angle β in relation to the central part 21 and arranged at a front edge 42 of the central part 21 in relation to the rotational direction rd of the cutting head 11 during rotation of the cutting head 11. Preferably, the further angle β is 90°.

Thus, in relation to the rotational direction rd, the front part 39 of the cutting element 17 meets air or materia to be cut before the rear part 25 during rotation of the cutting head 11 in the rotational direction rd.

The front part 39 is arranged on the opposite side of a plane p through the central part 21 in relation to the rear part 25.

Preferably, the further angle β is 90°.

With reference to FIG. 2.3, the central part 21 of the cutting element 17 may have a shape of a further trapezoid. In a similar way to the rear part 25, the central part 21 may comprise two long parallel sides and two short sides, wherein the short side at the lower side 37 of the cutting element 17 is arranged at different angles than 90°. The shorter side of the two long parallel sides of the central part 21 is connected to the rear part 25. With advantage, the central part 21 and the rear part 25 are arranged such that there is a continuous lower side of the cutting element 17 formed by the acute angled short sides of the central part 21 and the rear part 25. Thus an improved plough/wedge like shape of the cutting element is provided which improves the cutting characteristics of the cutting element 17.

The front part 39 of the cutting element 17 may have a shape of a triangle. Preferably, the triangle is a right-angled triangle with one of the perpendicular sides connected to the central part 21 and the other perpendicular side arranged at the top, i.e. at the upper side 35 of the cutting element 17 in relation to the intended position for use of the. Thus, the front part 39 is angled as a wedge pointing downwards towards the ground in the intended position for use. With the shape of a triangle of the front part 39 cutting and removing of the cut materia by the front part 39 is improved. Thus, a yet improved plough/wedge like shape of the cutting element 17 is provided which yet improves the cutting characteristics of the cutting element 17.

The applicant has made several tests showing that the angle 7 between the central part 21 and the rear part 26 that is preferably around 120-1450 is advantageous regarding the cutting and removing characteristics. Further, the angle between the hypotenuse and the long leg of the triangle shaped front part 39 may, for example be between 10 and 45°. Further, the first length z1 of the long side of the rear part 25 may, for example, be around 50-80% of the second length z2, that is the total length of the cutting element 17.

The cutting element 17 is made of a sheet material, preferably of a metal plate.

Preferably, the cutting element 17 is arranged as a one-piece element, preferably made by a bending process of a prefabricated piece of a sheet material.

With reference to FIG. 3.1 and FIG. 3.2, trimming apparatus 3 comprising the rotatable part 1 illustrated in FIG. 1 is depicted.

Thus, FIG. 3.1 and FIG. 3.2 illustrate a trimming apparatus 3 arranged for cutting and removing of grass and other vegetation adjacent a sprinkler head of a watering system, The trimming apparatus 3 comprises:

a supporting part 41 and a rotatable part 1 illustrated in FIG. 1.

The supporting part 41 comprises:

a hollow elongated handle 43 having a further lower end 7' and a further upper end 9' in an intended position for use of the supporting part 41 and a supporting head 45 connected to the further lower end 7' of the hollow elongated handle 43.

The elongated shaft 5 of the rotatable part 1 is positioned inside the hollow elongated handle 43 such that the elongated shaft 5 can rotate about a center longitudinal axis a in relation to the hollow elongated handle 43 and can move in a first and second direction s1, s2 along the center longitudinal axis a in relation to the hollow elongated handle 43.

The supporting head 45 is arranged to enclose the cutting head 11 of the rotatable part 1 in a retracted position of the rotatable part 1 in relation to the supporting part 41. In the retracted position, for example for transport of the trimming apparatus 3, the rotatable part 1 is displaced towards the supporting part 41 in the direction s2 such that the cutting head 11 is hidden within the supporting head 45.

According to the embodiments illustrated in FIG. 3.1 and FIG. 3.2, the supporting head 45 has a tubular framework shape with a first diameter d1. The first diameter d1 is greater than a second diameter d2 of the cutting head 11. Therefore, the cutting head 11 can be positioned within the supporting head 45.

A user can be provided with several cutting heads 11, each cutting head having different diameter d1 to enable the user to adapt the trimming apparatus 3 to specific dimensions of sprinkler heads intended to be cleaned from grass or other vegetation by means of the trimming apparatus 3.

Preferably, the supporting head 45 comprises a number of supporting elements 47 arranged on an outer surface 49 of the supporting head 45 intended to face the ground during use of the trimming apparatus 3 and arranged to be inserted into the ground.

The supporting part 41 may comprise a locking mechanism 51 arranged o lock the rotatable part 1 in relation to the supporting part 41.

Preferably, the locking mechanism 51 is arranged at the hollow elongated handle 43 and is arranged to act with pressure forces on the elongated shaft 5 of the rotatable part 1 to lock the rotatable part 1 in relation to the supporting part 41. Thus, the hollow elongated handle may comprise a through opening arranged to receive a spring biased member acting with pressure forces on the elongated shaft 5, which member can be displaced backwards in a direction from the elongated shaft 5 to release the pressure forces and thereby to enable a movement of the elongated shaft 5 in relation to the elongated handle 43.

According to the embodiments illustrated in FIG. 3.1, the locking mechanism 51 is arranged integrated with a handle 51 for holding of the trimming apparatus 3 during use.

In use the following steps may be performed to cut materia around a sprinkler head:

1. Cantering the cutting head 11 around the sprinkle head by moving the rotatable part 1 in the first direction s1 toward the sprinkle head,
2. Positioning the supporting head 45 on the ground, wherein the user feet can be used for proper positioning of the supporting elements 47 in the ground,
3. Lifting the rotatably part 1 by moving the rotatable part in the second direction s2 from the ground,
4. Starting the driving device (not shown) attached to the upper end 9 of the elongated shaft 5 to achieve the rotation of the elongated shaft 5 and thereby of the cutting head 11 and
5. Moving the rotatable part 1 towards the ground in the first direction s1 to cut and remove the materia around the sprinkle head.

The invention claimed is:

1. A rotatable part of a trimming apparatus arranged for cutting and removing of grass and other vegetation adjacent a sprinkler head of a watering system, the rotatable part comprises:

an elongated shaft having a lower end and an upper end in an intended position for use of the rotatable part, wherein the elongated shaft is configured for rotation about a center longitudinal axis (a) extending through the elongated shaft, wherein the upper end is arranged for connection to a driving device to achieve the rotation of the elongated shaft, and a cutting head comprising a connection central portion arranged for connection of the cutting head to the lower end of the elongated shaft and arranged for transfer of the rotation of the elongated shaft to the cutting head, wherein the cutting head comprises at least one arm, extending radially from the connection central portion, wherein the at least one arm comprises a cutting element connected to a distal end of the at least one arm in relation to the attachment central portion, wherein the cutting element comprises:

a central part connected tangentially to an outermost edge of the distal end of the at least one arm radially in relation to the connection central portion, the central part having an inward surface facing the connection central portion and an outward surface facing away from the connection central portion, and a rear part arranged at an angle in relation to the central part and arranged at a rear edge of the central part in relation to a rotational direction of the cutting head during rotation of the cutting head, wherein the cutting element comprises a front part arranged at a further angle in relation to the central part and arranged at a front edge of the central part in relation to the rotational direction of the cutting head during rotation of the cutting head, wherein the front part is arranged on the opposite side of a plane through the central part in relation to the rear part, and wherein the front part extends radially inward toward the connection central portion beyond the inward surface of the central part and the rear part extends radially outward away from the connection central portion beyond the outward surface of the central part.

2. The rotatable part according to claim 1, wherein the angle is 90°.

3. The rotatable part according to claim 1, wherein the rear part has a shape of a trapezoid with two long sides arranged parallel to each other, a third short side arranged substantially perpendicular to the long sides and a fourth short side arranged with other angles than 90° in relation to the long sides.

4. The rotatable part according to claim 3, wherein the cutting element has an upper side and a lower side in the intended position for use of the rotatable part and wherein the fourth short side is arranged at the lower side of the cutting element.

5. The rotatable part according to claim 3, wherein the rear part has a first long side and a second long side of the two long sides, wherein the second long side is arranged to have contact with the central part and wherein the second long side is longer than the first long side arranged at a distance from the central part, and wherein a first length of the second long side of the rear part is between 50% and 80% a total length of the cutting element.

6. The rotatable part according to claim 1, wherein the central part of the cutting element has a shape of a trapezoid.

7. The rotatable part according to claim 1, wherein the front part of the cutting element is shaped as a right-triangle having a first perpendicular side connected to the central part and a second perpendicular side extending radially inward in contact with the at least one arm.

8. The rotatable part according to claim 1, wherein the cutting element is made of a sheet material including a metal plate.

9. The rotatable part according to claim 1, wherein the cutting element is arranged as a one-piece element made by a bending process of a prefabricated piece of a sheet material.

10. A trimming apparatus arranged for cutting and removing of grass and other vegetation adjacent a sprinkler head of a watering system, the trimming apparatus comprises:

a supporting part and a rotatable part according to claim 1, wherein the supporting part comprises:

a hollow elongated handle having a further lower end and a further upper end in an intended position for use of the supporting part and a supporting head connected to the further lower end of the hollow elongated handle, wherein the elongated shaft of the rotatable part is positioned inside the hollow elongated handle such that the elongated shaft can rotate about the center longitudinal axis in relation to the hollow elongated handle and can move in a first and second direction along the center longitudinal axis in relation to the hollow elongated handle, wherein the supporting head is arranged to enclose the cutting head of the rotatable part in a retracted position of the rotatable part in relation to the supporting part.

11. The trimming apparatus according to claim 10, wherein the supporting head comprises a number of supporting elements arranged on an outer surface of the supporting head intended to face the ground during use of the trimming apparatus and arranged to be inserted into the ground.

12. The trimming apparatus according to claim 10, wherein the supporting part comprises a locking mechanism arranged to lock the rotatable part in relation to the supporting part.

13. The trimming apparatus according to claim 12, wherein the locking mechanism is arranged at the hollow elongated handle and is arranged to act with pressure forces on the elongated shaft of the rotatable part to lock the rotatable part in relation to the supporting part.

14. The trimming apparatus according to claim 10, wherein the supporting head has a tubular framework shape with a first diameter greater than a second diameter of the cutting head.

* * * * *